Oct. 20, 1925.
B. ELIGGI ET AL
1,557,817
AUTOMOBILE SIGNALING DEVICE
Filed Oct. 2, 1922     4 Sheets-Sheet 1
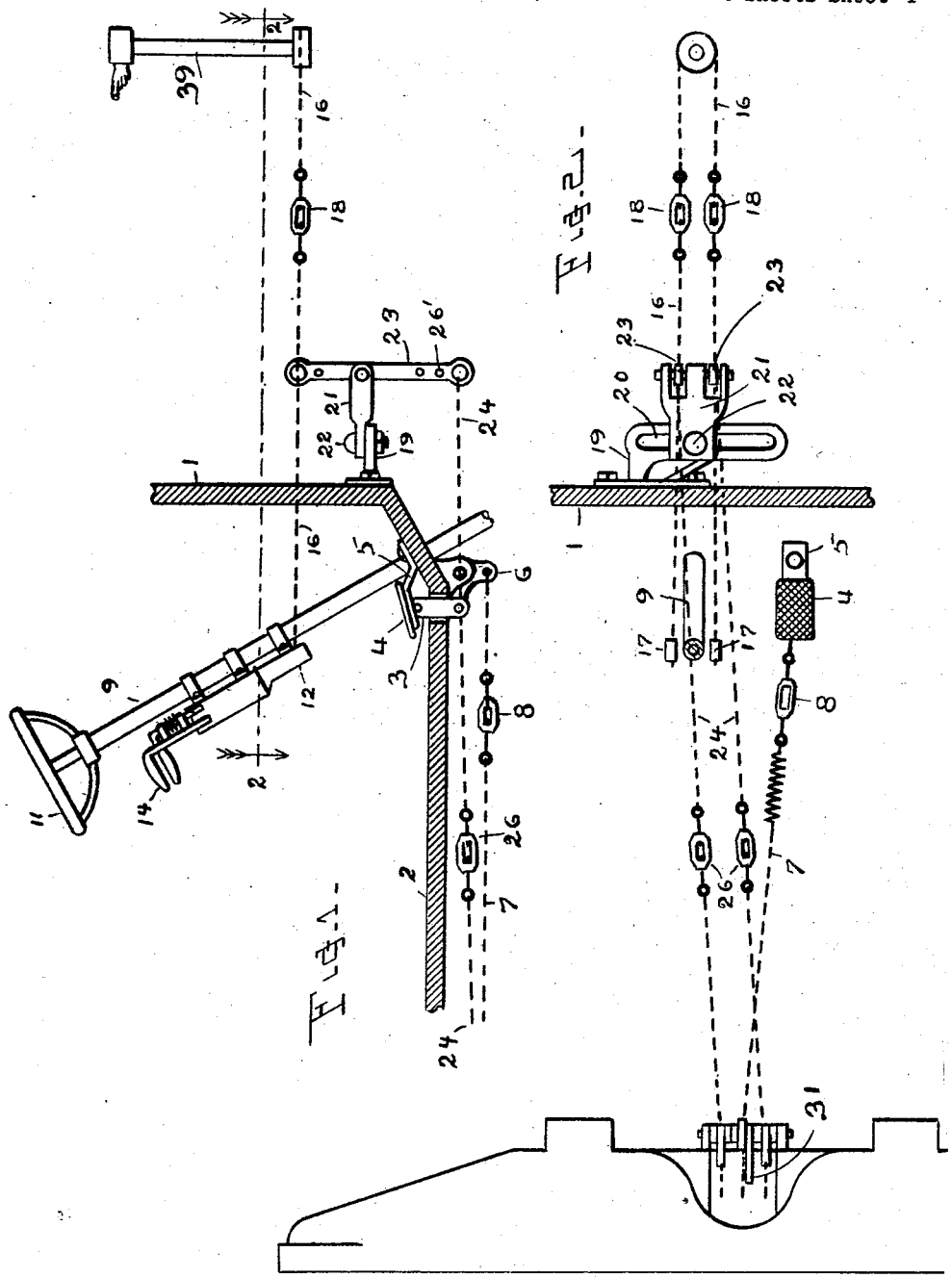
Inventors
B. Eliggi and
L. Lorenzi
per A. S. Paré
Attorney

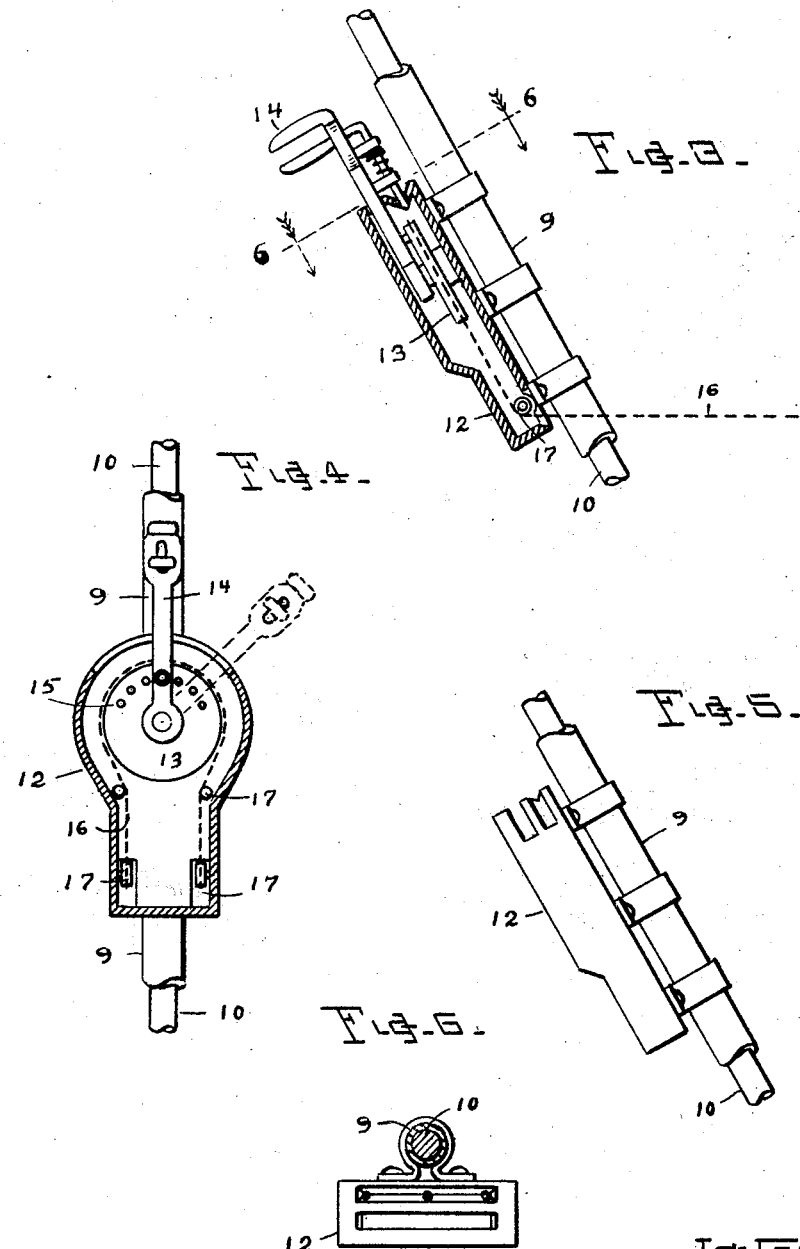

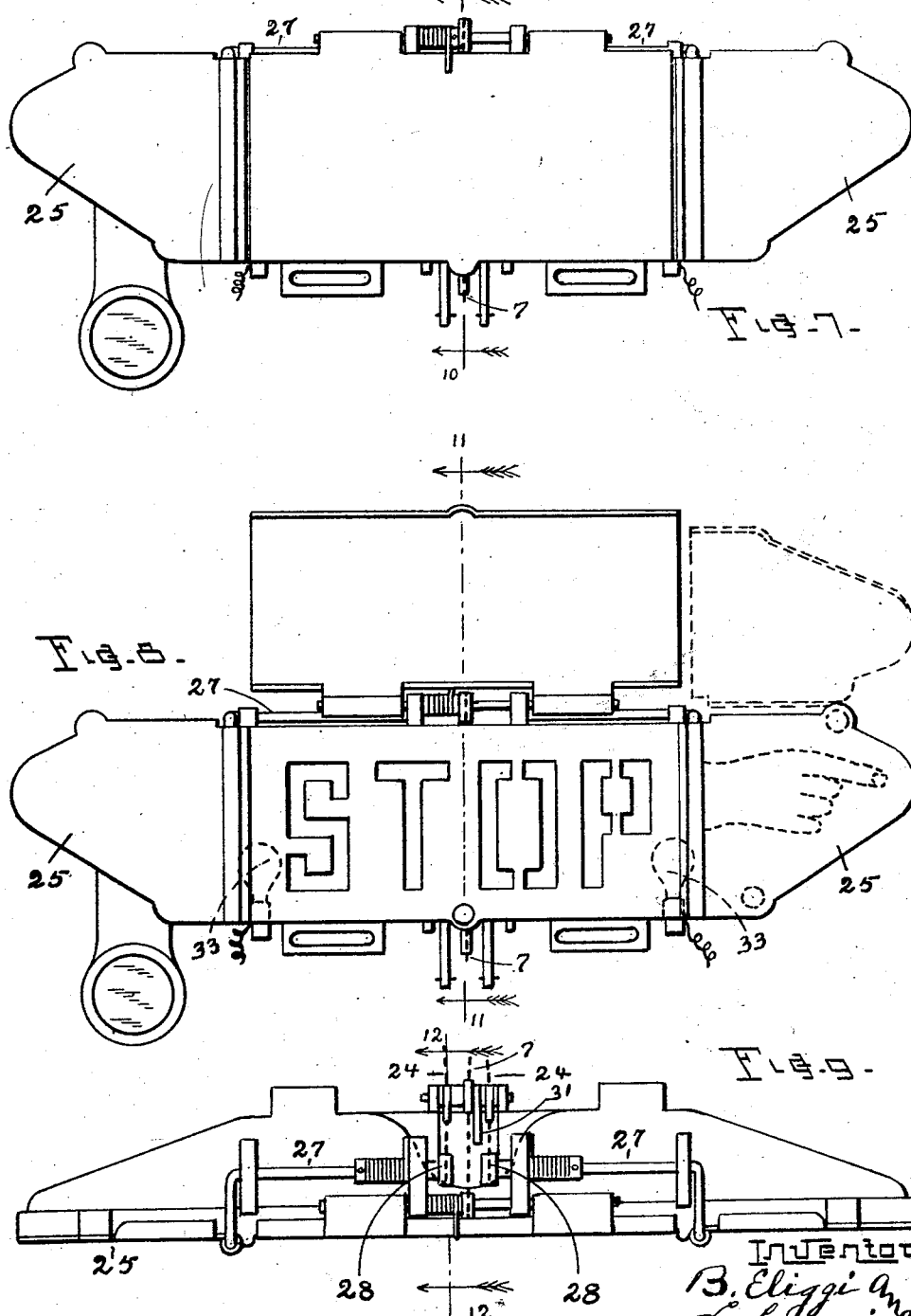

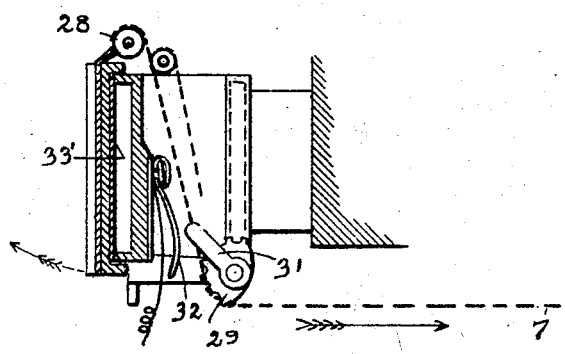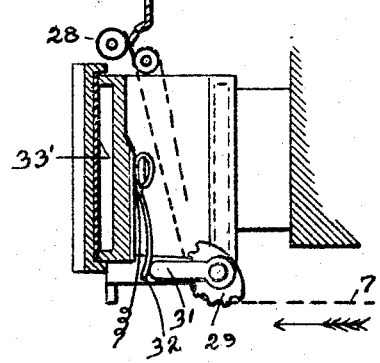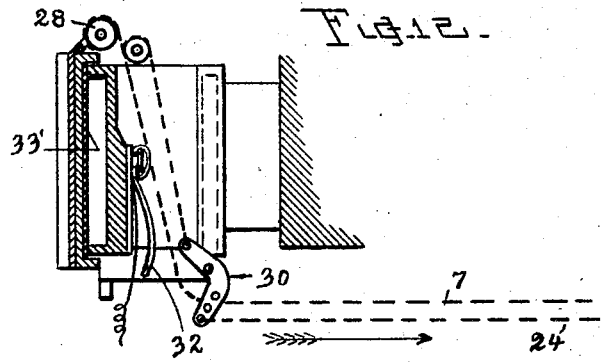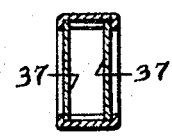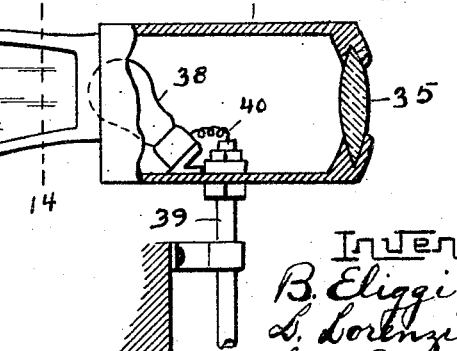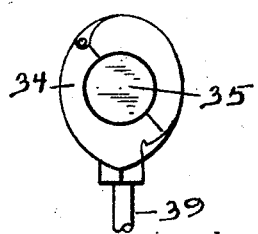

Patented Oct. 20, 1925.

1,557,817

UNITED STATES PATENT OFFICE.

BARTOLOMEO ELIGGI AND LUIGI LORENZI, OF SAN FRANCISCO, CALIFORNIA.

AUTOMOBILE SIGNALING DEVICE.

Application filed October 2, 1922. Serial No. 591,875.

*To all whom it may concern:*

Be it known that we, BARTOLOMEO ELIGGI and LUIGI LORENZI, both subjects of Italy, residing in the city and county of San Francisco and State of California, have jointly invented certain new and useful Improvements in Automobile Signaling Devices, whereof the following is a specification.

This invention relates to direction signals for vehicles, especially automobiles.

The main feature of the invention include a pointer at the front of the vehicle, normally pointing toward the driver but adapted to be swung to right or left when a turn is in contemplation. Also indicators at the rear of the vehicle, containing the words Stop, Right, and Left, or signs to such effect, exposed by the raising of a lid, or lids, at the will of driver. Also means for operating these various signals.

Other features and objects will appear hereinafter.

In the accompanying 4 sheets of drawings we have illustrated our invention, as applied to an automobile.

Figure 1 is a side elevation showing the forward signal, the connections leading to the rear signals, and the means for operating the signals; also showing the dash and floor of an automobile in section.

Figure 2 is a plan, or view from above, partly in section, showing the same parts as seen from the line 2—2 of Figure 1.

Figure 3 is a side view of the hand operating means, showing the hollow steering post of an automobile with the steering rod inside, and showing in section, the housing for the steering hand operating means, with the latter in side elevation therein.

Figure 4 is a face view of the parts in Figure 3, with the front side of the housing removed to expose the interior.

Figure 5 is a side elevation of the parts in Figures 3 and 4, but with the operating handle omitted.

Figure 6 is a section on the line 6—6 of Figure 3.

Figure 7 is a face view of the rear signal housing, closed.

Figure 8 is a similar view but with two of the lids raised to expose the signals within, one of the lids and the signal under it in dotted lines.

Figure 9 is a top view of Figure 7.

Figure 10 is a cross-section on line 10—10 of Figure 7, showing the means for operating the stop lid and switch device, and connection thereof with a foot treadle.

Figure 11 is a cross-section on line 11—11 of Figure 8, showing the stop lid opened and the switch in operation.

Figure 12 is a cross-section on line 12—12 of Figure 9, and shows the means for operating the lids of the direction signal.

Figure 13 is an elevation, partly in section, of the forward direction pointer, and contiguous parts.

Figure 14 is a cross-section thereof, at line 14—14 of Figure 13.

Figure 15 is an end view thereof of the end remote from the pointer.

Referring to the drawings, and the figures thereof:—The dash board and floor of an automobile are represented conventionally at 1 and 2, respectively. In the floor 2 is a treadle stem 3 having a foot treadle 4 at its upper end, and a spring 5 applied to support those parts in their upper position. The treadle stem 3 connects at its lower end to the horizontal arm of a bell crank 6, the vertical arm of which may be connected to the brake and also to a pull 7 to operate the stop signal lid, as will be hereinafter described. A turnbuckle 8 serves to adjust the length of the pull.

At 9 is the fixed steering post having the steering rod 10 shown in Figures 3, 4 and 5, inside it, and the steering wheel 11 at its top. Secured to the post 9 is a housing 12 containing a disc 13, pivoted at its center and provided with a handle 14 projecting therefrom.

The handle 14 is adjustably secured to the disc by a pin or bolt entering one of a series of holes 15, provided in the disc for that purpose. A chain 16 embraces the disc, engaging teeth thereon not shown, so as to be moved thereby, and passing over idlers 17 and thence forward to forward direction indicator.

Turnbuckles 18 provide for adjustment of the length and tension of the chain 16. At a point on the front of the dash-board 1, is secured a bracket 19 having a horizontal slot 20 therein. An extension member 21 is fastened to the bracket by a bolt 22, passing through the slot 20, whereby the member 21 may be adjusted as to its lateral position.

Pivoted in the forked front end of member 21, are levers 23, connected at their upper ends to the chain 16, so as to be oscillated thereby. The lower ends of said levers connect by pulls 24 with the lids 25 of the rear direction signals, raising one of said lids and exposing the appropriate signal. Turnbuckles 26 provide for adjustment of the pulls 24. These levers may be provided with holes 26' for the exact position of chain 16 and pull 24.

The mechanism for operating the lids 25 is as follows:—The lids are hinged as at 27, and may close of their own weight, assisted by springs if desired. A wheel, or segment, 28 is connected to each lid as more particularly shown in Figure 9, and engaged by the respective pull 24, so that the lid is raised by a tension on said pull. Thus, when the forward signal indicates right, or left, one of the levers 23 is oscillated, the corresponding pull 24 raises a lid 25 exposing the appropriate rear signal. A wheel or segment 29, or a bell crank 30 as in Figure 12, is positioned at the change of direction of the pull, and an arm 31 thereon, contacts a spring 32 energizes an electric lamp 33 shown in dotted line Figure 8, in a manner apparent to any electric mechanic, and therefore not further set forth, and said lamp illustrates the stop and direction signals. The mechanism for raising the stop signal lid may be connected to the ordinary brake, foot treadle, and thereby automatically operated therewith, by the pull 7 secured to the treadle 4. Glasses or other transparent means of suitable color may be applied if desired, as seen at 33' Figures 10, 11 and 12.

The front signal consists of a casing 34 having at one end a lense or glass 35 and at the opposite end a hand with a pointing finger 36. The latter may be hollow and of rectangular cross section, and lined with colored glass or other transparent medium, as at 37, Figure 14. An electric lamp 38 serves to illuminate both the hand and the lense 35. Normally the hand points toward the driver of the vehicle, and the lense toward the direction of progress. When the signal is swung on its axis 39, the hand indicates the direction contemplated and the lense on the opposite end shows a red light which is automatically operated by wire 40 shown in Figure 13, and a proper switch, not shown, thus giving a double indication of a turn.

Having thus described our invention, and an embodiment of it, in the full, clear and exact terms required by law, and knowing that it comprises novel, useful and valuable improvements in the art to which it pertains, we here state that we do not wish to be limited to the precise construction and arrangement of the several parts, as herein set forth, as the same may be variously modified by a skilled mechanic without departing from the spirit and scope of our invention as defined in the appended claims.

What we claim and desire to secure by Letters Patent of the United States, is the following, to-wit:—

1. A vehicle direction signal comprising in combination a vertical oscillable member pivotally mounted upon the dash board of a vehicle, said member operatively connected with an illuminated pointer at the front end of the vehicle and with hinged lids at the rear end thereof, said lids when opened exposing direction signals corresponding with said pointer.

2. A vehicle signal comprising in combination, a pointer at the front end of the vehicle and normally closed signals at the rear end thereof, an intermediate oscillable member within reach of the driver, pulls connecting said member with said pointer and adapted to rotate the same, said pointer adapted to act as a lamp in normal position and indicator when rotated, said pulls also connected to the cover of the rear signals and adapted to expose the same.

3. A vehicle having in combination, signaling devices disposed at the front and rear ends of said vehicle an adjustable oscillating member therebetween connected to said signaling devices and means mounted upon the steering post of said vehicle for operating said oscillating member to expose direction signals at the rear and simultaneously rotate the front signal to view.

4. A vehicle having in combination, signaling devices, comprising a front pointer and a rear direction indicator, said direction indicator having hinged lids, a vertical oscillating member pivotally mounted between said pointer and indicator, flexible connections, connecting the upper end of said member to said front pointer and similar connections connecting the lower end of said oscillating member to said direction indicator, means for vertical adjustment of said member and manually operated means for operating said oscillating member.

5. A vehicle having a signaling device at the rear end thereof and a pointer at its front end, oscillating member pivotally mounted upon the dash board of the vehicle and connected to said signaling device and pointer, and means mounted upon the steering post of said vehicle for operating said oscillating member whereby both front and rear signals are exposed and illuminated.

6. A vehicle signal having a pointer at the front end of said vehicle, said pointer normally pointing directly backward, a vertical oscillating means for causing said pointer to point to either side, and expose light, and horizontally adjustable means for said oscillating means.

7. A vehicle signaling apparatus having at the rear of the vehicle a housing containing right and left signals, said signals normally concealed by spring actuated lids, oscillating means for operating any one of said signals at will, and simultaneously rotating a pointer at the front end of the vehicle and mechanism mounted upon the steering post and adapted to operate said oscillating means.

8. A vehicle signaling device having a front pointer, and rear direction indicators, said pointer carrying a lamp normally pointing ahead, an oscillating member mounted upon the dash board of said vehicle, adjustable cables connecting said pointer and direction indicators to said oscillating member, a hand operated lever mechanism adjustably mounted upon the steering post of said vehicle adapted to operate said oscillating means and thereby simultaneously actuate said pointer and direction indicators.

In testimony that we claim the foregoing, we have hereto set our hands this 23 day of September, 1922.

BARTOLOMEO ELIGGI.
LUIGI LORENZI.